— Patent text —

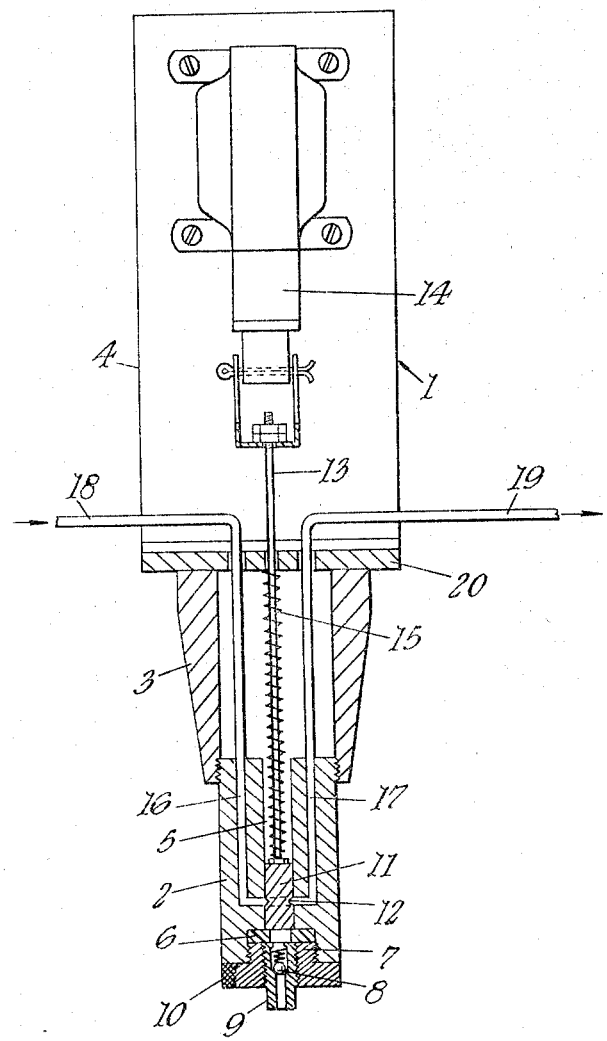

United States Patent Office 3,289,482
Patented Dec. 6, 1966

3,289,482
SAMPLING DEVICE
David W. Grant, Gomersal, near Leeds, England, assignor to The Coal Tar Research Association, Yorkshire, England
Filed Feb. 28, 1964, Ser. No. 348,131
4 Claims. (Cl. 73—422)

This invention relates to a device for taking a sample of gas and supplying this sample to a gas analyzer. The word "gas" as used in this specification includes vapor and includes a mixture of individual gases or vapors, unless specifically stated otherwise. Usually prior to analysis, the individual gases are separated, though in certain cases, it is possible to analyze the sample without the need for prior separation.

The separation is normally effected by the use of a chromatographic column which is packed with a suitable absorbing medium and through which a continuous flow of gas is maintained. The mixture of gases is passed through the column, which is held at a suitable temperature, and the individual gases are carried by the gas stream at a rate dependent on their degree of absorption in the absorbing medium. Provided the column is sufficiently long, the individual gases can be separated.

The components may be detected at the column exit by the continuous measurement of the electrical conductivity of the eluent gas stream after ionization has been induced by suitable means. This measurement may be monitored either by means of a potentiometric recorder, or, in the case of high speed analysis, by a cathode ray tube having a high persistance time. Peaks are then usually obtained corresponding to each eluted individual gas, the areas of the peaks being linearly related to the concentration of the individual gas in the initial mixture.

The injection of samples of a known and reproducible amount into the chromatography column has frequently been a problem if small quantities are involved. With liquid samples, the injection is generally carried out manually, for instance either with hypodermic syringe or a micropipette. Gas samples can also be injected from a syringe, but in connection with process monitoring equipment, better methods become desirable. Various methods have been evolved requiring a separate flow line containing a sampling valve. Although these methods may be efficient in their field of application, they cannot usually be applied satisfactorily either to static systems or to the sampling of vapors in a still where the composition of the vapors at various single points is required.

It is an object of this invention to provide a sampling device which can take a sample from a static system.

It is another object of this invention to provide a sampling device which can sample vapors from a still where the composition of the vapors at various single points is required.

Further objects will become apparent as the description proceeds.

This invention consists in a device for taking a sample of gas and supplying the sample to a gas analyzer comprising means defining a withdrawal duct, chamber means, means defining an inlet duct to said chamber means and an outlet duct from said chamber means for passing a gas of known composition to said analyzer through said chamber means, a withdrawal duct, and piston means for withdrawing said sample through said withdrawal duct into said chamber means.

The size of the sample can be controlled by the size of the chamber, and the withdrawing means and the valve-controlled means can be automatically actuated, for instance in accordance with a programmed cycle. The moving parts of the withdrawing means and of the valve-controlled means can be designed to have sufficiently low inertia for the device to be synchronized with the scanning and fly-back mechanism of a cathode ray tube which may be used in the gas analyzer.

Though it is possible to actuate the withdrawing means and the valve-controlled means manually, or for example using a pressure fluid operated actuator, it is desirable that a solenoid actuator is used, as the solenoid can be connected directly into circuitry associated with an electrical gas analyzer.

It is desirable that the gas flow to the gas analyzer be substantially continuous, the continuity possibly being interrupted briefly during the actuation of the withdrawing means and of the valve-controlled means.

Preferably, the withdrawing means and the valve-controlled means are associated with one another such that they can be actuated simultaneously. It is convenient to link the withdrawing means and the valve-controlled means mechanically for this simultaneous actuation. In one arrangement, the device is provided with a bore having a one-way valve in its forward end, a piston being slidably mounted in the bore in sealing contact with the walls of the bore and ducts being provided for passing said gas flow transversely across the bore, the piston in its forward position defining a passageway for the gas flow across the bore, and being retractable, by actuating means, to a position rearward of said ducts, to draw a sample of gas into the bore through the non-return valve, which sample can be carried away by the gas flow. Thus, in this arrangement, the withdrawing means and the valve-controlled means are combined, and said chamber is formed in the bore by the retraction of the piston. This arrangement can be used to sample gas both from a static system and from a flowing system. Normally, the passageway across the bore will not be in communication with the forward end of the piston, and may be provided, for example, by a transverse bore or groove in the piston coinciding with the ends of said ducts in the forward position of the piston. It is desired that the piston be biased into its forward position, conveniently with a compression spring, and a shock-absorbing washer may be provided as a stop to stop the piston in its forward position. This shock-absorbing washer may be in the form of an annular washer with a central aperture of a diameter less than the diameter of the piston bore, the washer being mounted at the end of the piston bore, such that the sample is drawn in through the washer.

The invention will be described by way of example with reference to the accompanying drawing, which is an elevation of a gas sampling device, mainly in cross-section along its longitudinal axis.

The device 1 has a sampling head 2 screwed into a conical member 3 which projects from a main body 4 of the device. A main bore 5 is formed in the head 2, and an annular washer 6 partially obstructs the end of this bore 5. The washer 6 is retained in position by a retaining bushing 7 having a knurled flange 10 which is screwed into the end of the head 2. A one-way ball valve 8 is provided in the end portion of the head 2, and valve housing 9 is screwed into the bushing 7.

A piston 11, provided with an annular groove 12, is slidably mounted in the main bore 5, and its piston rod 13 is connected to a solenoid actuator 14. The piston 11 is biased into the forward position as shown in the drawing by a spring 15. Two ducts, a gas inlet duct 16 and a gas outlet duct 17, are formed in the sampling head 2, and the ducts 16 and 17 join the main bore 5 on either side of the position occupied by the annular groove 12 when the piston 11 is in its forward position. The ducts 16 and 17 are connected to gas inlet and gas outlet conduits 18 and 19 respectively.

The main body 4 of the device is formed as a plate, for instance of brass, having a flange 20 to which the conical member 3 is attached. The actuator 14 is bolted to the body 4. The sampling head and also the piston 11 may be formed of stainless steel to resist corrosion. In addition, the bushing 7, the ball valve 8 and the housing 9 may be formed of stainless steel. The washer 6, which acts as an end stop for the piston 11, is suitably formed of polytetrafluoroethylene. The piston 11 may be lubricated with, for instance molybdenum disulphide.

For use, the device 1 is connected with a system containing the gas to be sampled, and the end of the housing 9 and suitably the sampling head 2 protrude into the gas. The solenoid actuator 14 is de-energized such that the piston 11 is in its forward position, and the conduits 18 and 19 are connected into the supply line to a chromatographic column so that a continuous flow of gas, such as nitrogen, is maintained through the ducts 16 and 17 via the groove 12. To take a sample, the actuator 14 is energized to withdraw the piston 11 until the forward end of the piston is just rearward of the ports of the ducts 16 and 17. As the piston 11 is withdrawn, it momentarily seals the ducts 16 and 17 so that gas is drawn in through the valve 8, and then opens the ducts 16 and 17 so that the valve 8 closes, and the sample is carried away down the duct 17. It will be appreciated that it is necessary for the gas pressure in the duct 16 to be greater than the gas pressure in the system being sampled. It is desirable that the actuator 14 remains energized for a sufficient time to ensure that all the gas sample is carried away down the duct 17 before the piston 11 is returned to its forward position. The flow rate of the gas in the ducts 16 and 17 must be such that the sample is substantially completely scavenged and conveyed down duct 17 to the analyzer, preferably in the shortest possible time. Where the volume of sample is 0.3 ml., a flow rate of 50 ml./min. is appropriate. These figures are related to the length of time for which it is necessary for piston 11 to remain in the rearward position. As mentioned below, a time of 2 seconds is sufficient in these circumstances. The stroke of the piston 11 can be about ¼", and the diameter of the bore also is about ¼", so that samples of the order of ½ cc. can be taken. By increasing the stroke of the piston to ½" and altering the position of the ports of the ducts accordingly, the sample size is increased and results in a considerably improved repeatability. Thus, the standard deviation calculated from ten successive operations of the device lay between 2 and 3 percent of the volume taken. The size of sample admitted to the analyzer can be adjusted independently by means of a by-pass which vents a known proportion of the gas stream to the atmosphere. The by-pass may be situated at any position between the sampling device and the analyzer.

The device 1 has been tested in conjunction with gas chromatographic equipment employing a cathode ray tube to monitor the results. Samples of vapor from a five theoretical plate atmospheric distillation of benzene and toluene were taken automatically by synchronizing the operation of the solenoid actuator 14 with the fly-back mechanism of the cathode ray tube time base. The conditions of the analysis were adjusted to ensure a complete separation of the two components within 40 seconds, which corresponds to one value of the scan time of the equipment. The distillation was continued for two hours, during which time 150 operations of the sampling device occurred. Under the conditions used, the solenoid actuator 14 was energized for a time of 2 seconds to allow sufficient sampling. The results indicated that the samples taken were representative of the vapor at any time, and so the progress of the distillation could be followed easily. The pressure differential which existed between the gas stream in the ducts 16 and 17 and the vapor system was approximately one atmosphere, and no leakage was detected.

It will be appreciated that the device could be modified for use with pressure differentials greater than one atmosphere, such as might occur when the system being sampled is at reduced pressure.

The device can also be modified so as to allow heaters to be inserted so as to prevent any condensation of vapor. In one arrangement, the heaters consist of two 1 yard lengths of Nichrome wire, each having a resistance of 30 ohms and wound into a close helical spiral. The spirals are enclosed in small silica tubes, ¼" overall diameter x 2" long and these are inserted into channels which are drilled vertically into the wall of the sampling device. The channels are midway between the inner and outer faces of the wall and are diametrically opposite each other. The heaters are supplied with a maximum of 60 watts from a low voltage transformer and can be connected either in series or parallel.

From the foregoing description of the device 1, it will be understood that the basic idea underlying the construction is the incorporation of means for withdrawing a sample of the gas to be tested into a chamber, and valve-controlled means for passing a gas flow to any analyzer through this chamber, the chamber being formed between the ducts 16 and 17 in the bore 5 by the retraction of the piston 11, the cooperation of the piston 11 with the ports of the ducts 16 and 17 forming the valve-controlled means.

It is apparent that many modifications or alterations may be made in the construction described without departing from the spirit and scope of the invention.

I claim:
1. A device for taking a sample of gas and supplying the sample to a gas analyzer, comprising
    means defining a bore;
    means defining a sample withdrawal duct leading to one end of said bore from a sample source;
    one-way valve means in said withdrawal duct;
    piston means slidably mounted in said bore in sealing contact with the walls thereof;
    means defining an inlet duct to said bore and an outlet duct from said bore for passing a gas flow of known composition transversely across said bore to the analyzer;
    actuating means for retracting said piston in a direction away from said one end from a forward position at least partially forward of said inlet and outlet ducts to a rearward position at least partially rearward of said inlet and outlet ducts to provide a chamber in said bore for the sample between the inlet and outlet ducts and to withdraw said sample through said one-way valve into said chamber;
    said piston means in a forward position permitting said gas flow across said bore and sealing said gas flow from said withdrawal duct.

2. The device as claimed in claim 1 wherein said piston means define a transverse passageway across said bore coinciding with the ends of said inlet and outlet ducts in said forward position of said piston means for permitting said gas flow across said bore.

3. The device as claimed in claim 1 wherein said piston means is biased into said forward position.

4. The device as claimed in claim 1 wherein said actuating means comprise a solenoid actuator in operative connection with said piston means for actuating the same.

References Cited by the Examiner
UNITED STATES PATENTS

| | | | |
|---|---|---|---|
| 3,017,772 | 1/1962 | Wright | 73—422 |
| 3,056,278 | 10/1962 | Guenther | 73—23.1 |
| 3,100,984 | 8/1963 | Martin | 73—23.1 |

RICHARD C. QUEISSER, *Primary Examiner.*

J. FISHER, *Assistant Examiner.*